US012413390B2

(12) United States Patent
Geraud-Stewart

(10) Patent No.: US 12,413,390 B2
(45) Date of Patent: Sep. 9, 2025

(54) COMPRESSION OF MATRICES FOR DIGITAL SECURITY

(71) Applicant: QUALCOMM Incorporated, San Diego, CA (US)

(72) Inventor: Remi Geraud-Stewart, Mantes-la-Jolie (FR)

(73) Assignee: QUALCOMM Incorporated, San Diego, CA (US)

(*) Notice: Subject to any disclaimer, the term of this patent is extended or adjusted under 35 U.S.C. 154(b) by 207 days.

(21) Appl. No.: 18/161,729

(22) Filed: Jan. 30, 2023

(65) Prior Publication Data

US 2024/0259185 A1   Aug. 1, 2024

(51) Int. Cl.
| | |
|---|---|
| *H04L 9/00* | (2022.01) |
| *G06F 7/08* | (2006.01) |
| *H04L 9/06* | (2006.01) |
| *H04L 9/08* | (2006.01) |
| *H04L 9/30* | (2006.01) |

(52) U.S. Cl.
CPC ............ *H04L 9/0662* (2013.01); *G06F 7/08* (2013.01); *H04L 9/0825* (2013.01); *H04L 9/3026* (2013.01)

(58) Field of Classification Search
CPC ... H04L 9/0662; H04L 9/0825; H04L 9/3026; H04L 2209/30; G06F 7/08; G06F 21/602; H03M 7/3077; H03M 7/40; H03M 7/6029
See application file for complete search history.

(56) References Cited

U.S. PATENT DOCUMENTS

| | | | |
|---|---|---|---|
| 2009/0254521 A1* | 10/2009 | Raman | ................... H03M 7/40 |
| 2024/0048393 A1* | 2/2024 | Beckwith | ............. H04L 9/3093 |

FOREIGN PATENT DOCUMENTS

| | | |
|---|---|---|
| WO | 2022003702 A1 | 1/2022 |
| WO | 2022225536 A1 | 10/2022 |

OTHER PUBLICATIONS

International Search Report and Written Opinion—PCT/US2024/011247—ISA/EPO—Apr. 4, 2024.

* cited by examiner

*Primary Examiner* — Syed M Ahsan
(74) *Attorney, Agent, or Firm* — Polsinelli

(57) ABSTRACT

Systems and techniques are described herein for compressing data used in cryptographic operations. For example, a process may include obtaining a first data structure, wherein the first data structure comprises polynomials; generating a second data structure based on the first data structure, wherein the second data structure comprises coefficients of the polynomials; sorting the second data structure in an ascending order to obtain a sorted second data structure; updating the sorted second data structure based on differences between elements of the sorted second data structure to obtain a delta-encoded data structure; performing an entropy coding on the delta-encoded data structure to obtain an entropy-encoded output; recovering an updated first data structure using the entropy-encoded output, wherein the updated first data structure corresponds to the first data structure with a different order of first data structure elements; and performing a cryptographic operation using the updated first data structure.

30 Claims, 5 Drawing Sheets

COMPRESSION OF MATRICES FOR DIGITAL SECURITY

FIELD

The present disclosure generally relates to encryption/decryption of data. For example, aspects of the present disclosure relate to systems and techniques for reducing an amount of storage space required to store matrices used to encrypt and/or decrypt data.

BACKGROUND

Computing devices often employ various techniques to protect data. As an example, data may be subjected to encryption and decryption techniques in a variety of scenarios, such as writing data to a storage device, reading data from a storage device, writing data to or reading data from a memory device, encrypting and decrypting blocks and/or volumes of data, encrypting and decrypting digital content, performing inline cryptographic operations, etc. Such encryption and decryption operations are often performed, at least in part, using a security information asset, such as a cryptographic key, a derived cryptographic key, etc. As computing devices become more advanced, more advanced techniques for securing data may be used.

As an example, matrices may be used to encrypt and/or decrypt data. However, storing such matrices may require large amounts of computer storage. Additionally, if such matrices are not stored, the matrices must be re-generated in order to perform encryption and/or decryption operations, which may be computationally expensive (e.g., consuming large amounts of computational resources of a computing device). Therefore, it may be advantageous to store a representation of a matrix that requires less storage space, and/or is less computationally expensive to use for encryption and/or decryption.

SUMMARY

Systems and techniques are described herein for reducing the storage space required for storing a matrix on computing devices, where the matrix is to be used for performing cryptographic operations (e.g., digital signing, digital signature verification, etc.). According to some aspects, a data structure (e.g., a matrix) may be delta-encoded, then entropy encoded, to produce an entropy encoded output. In some examples, the entropy encoded output may be entropy-decoded, delta-decoded, and shuffled to produce a data structure (e.g., a matrix) for use in a lattice-based cryptographic technique for securing data.

According to at least one example, a process for compressing data used in cryptographic operations is provided. The process includes: obtaining a first data structure, wherein the first data structure comprises polynomials; generating a second data structure based on the first data structure, wherein the second data structure comprises coefficients of the polynomials; sorting the second data structure in an ascending order to obtain a sorted second data structure; updating the sorted second data structure based on differences between elements of the sorted second data structure to obtain a delta-encoded data structure; performing an entropy coding on the delta-encoded data structure to obtain an entropy-encoded output; recovering an updated first data structure using the entropy-encoded output, wherein the updated first data structure corresponds to the first data structure with a different order of first data structure elements; and performing a cryptographic operation using the updated first data structure.

In another illustrative example, an apparatus for compressing data used in cryptographic operations is provided. The apparatus may include at least one memory; and at least one processor coupled to the at least one memory and configured to: obtain a first data structure, wherein the first data structure comprises polynomials; generate a second data structure based on the first data structure, wherein the second data structure comprises coefficients of the polynomials; sort the second data structure in an ascending order to obtain a sorted second data structure; update the sorted second data structure based on differences between elements of the sorted second data structure to obtain a delta-encoded data structure; perform an entropy coding on the delta-encoded data structure to obtain an entropy-encoded output; recover an updated first data structure using the entropy-encoded output, wherein the updated first data structure corresponds to the first data structure with a different order of first data structure elements; and perform a cryptographic operation using the updated first data structure.

In another illustrative example, non-transitory computer-readable medium having stored thereon instructions is provided. When executed, the instructions may cause one or more processors to: obtain a first data structure, wherein the first data structure comprises polynomials; generate a second data structure based on the first data structure, wherein the second data structure comprises coefficients of the polynomials; sorting the second data structure in an ascending order to obtain a sorted second data structure; update the sorted second data structure based on differences between elements of the sorted second data structure to obtain a delta-encoded data structure; perform an entropy coding on the delta-encoded data structure to obtain an entropy-encoded output; recover an updated first data structure using the entropy-encoded output, wherein the updated first data structure corresponds to the first data structure with a different order of first data structure elements; and perform a cryptographic operation using the updated first data structure.

According to at least one example, an apparatus for information protection is provided. The apparatus comprises: means for obtaining a first data structure, wherein the first data structure comprises polynomials; means for generating a second data structure based on the first data structure, wherein the second data structure comprises coefficients of the polynomials; means for sorting the second data structure in an ascending order to obtain a sorted second data structure; means for updating the sorted second data structure based on differences between elements of the sorted second data structure to obtain a delta-encoded data structure; means for performing an entropy coding on the delta-encoded data structure to obtain an entropy-encoded output; means for recovering an updated first data structure using the entropy-encoded output, wherein the updated first data structure corresponds to the first data structure with a different order of first data structure elements; and means for performing a cryptographic operation using the updated first data structure.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), a system-on-a-chip (SoC), any combination thereof, and/or other type of device. In some aspects, the apparatus(es) include(s) a display for displaying one or more images, notifications, and/or other displayable data. In some aspects, the apparatus(es) include(s) can include one or more sensors (e.g., one or more RF sensors), such as one or more gyroscopes, one or more gyrometers, one or more accelerometers, any combination thereof, and/ or other sensor(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
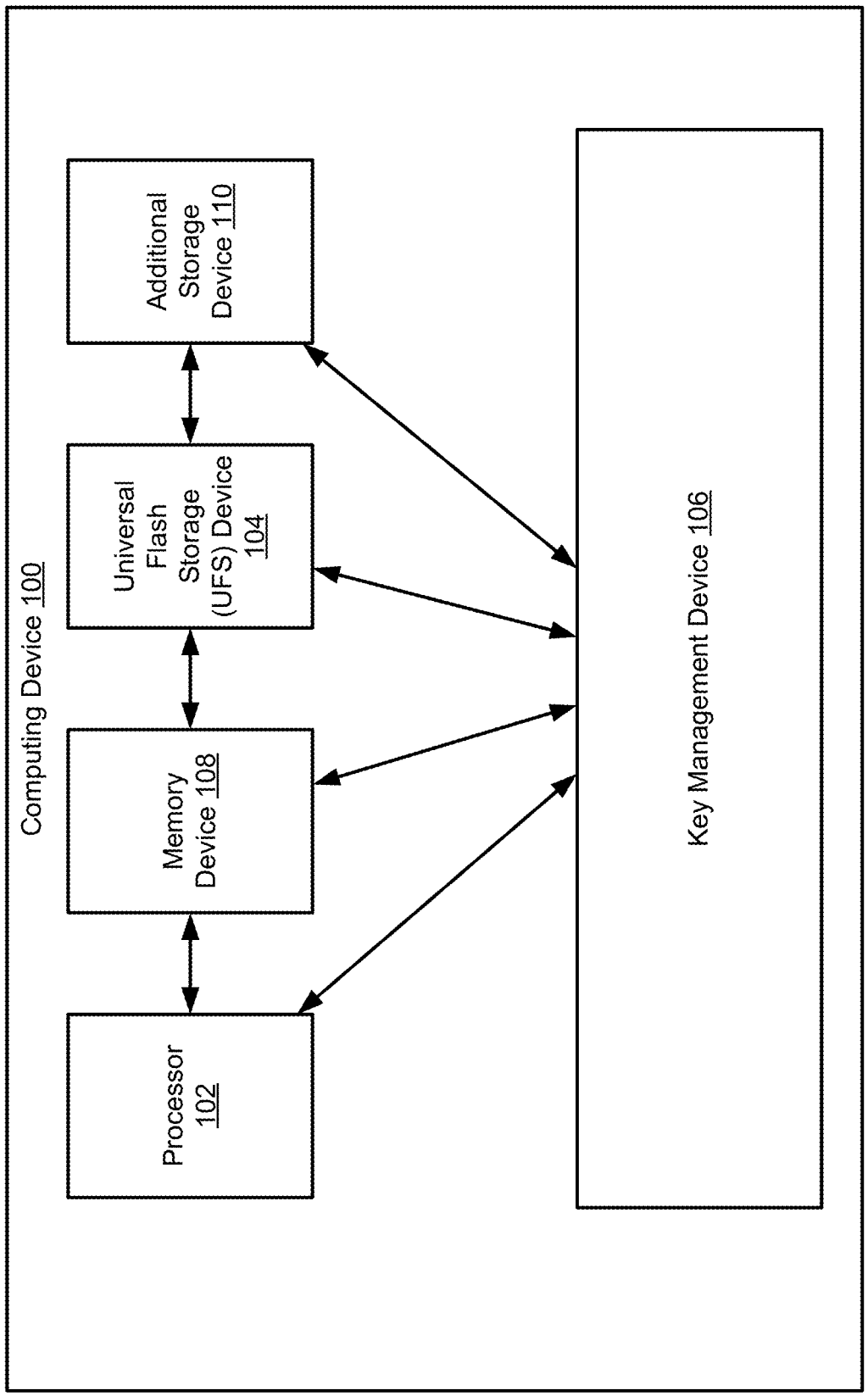
FIG. 1 is a block diagram illustrating certain components of a computing device, in accordance with some examples.

Certain aspects and examples of this disclosure are provided below. Some of these aspects and examples may be applied independently and some of them may be applied in combination, as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named (or numbered) components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides illustrative examples only, and is not intended to limit the scope, applicability, or configuration of the disclosure. Rather, the ensuing description of the illustrative examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection (or any variation thereof), means that there exists between elements/components/devices, etc. a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things, and/or may inadvertently share things, other than information, such as, for example, electrical current, radio frequency signals, power supply interference, interference due to proximity, interference due to re-use of the same wire and/or physical medium, interference due to re-use of the same register and/or other logical medium, etc.

Systems, apparatuses, processes (also referred to as methods), and computer-readable media (collectively referred to as "systems and techniques") are described herein for reducing the size of data representing a matrix being used to perform cryptographic operations (e.g., encryption and/or decryption) on computing devices. As computing devices become more advanced, updated techniques for performing cryptographic operations are increasingly important. As an example, as quantum computers become more relevant, existing techniques for securing information via cryptographic operations may become obsolete. One technique for securing information in a post-quantum computing environment is to leverage difficult mathematical problems in lattices to design secure digital signatures, encryption, and decryption. Such a technique may for example, use matrices of polynomials as cryptographic keys. One example of such a scheme is the Dilithium algorithm. A lattice-based cryptographic technique may use a particular matrix that is used for signing and/or verification of data. Generally, the matrix must be either stored, which is expensive in terms of storage space, or re-generated, which is expensive in terms of computational resources required.

Matrices used for cryptographic operations generally start with a matrix that includes as elements polynomials of a given degree and having coefficients of less than a certain amount. As an example, the Dilithium matrix includes elements that are polynomials of 256 degrees and that have coefficients that are less than two raised to the thirty-second power. The matrix is a four-by-four matrix (in this context). While the number of elements in such a matrix is not large, each element in the matrix is large. As an example, such a matrix has four rows, multiplied by four columns of elements (e.g., sixteen elements), each of which includes 256 coefficients, each of which is represented as thirty-two bits, which is approximately eight kilobytes of data. As such, the amount of storage space required to store such a matrix may be large, and the computational resources needed to generate and/or re-generate the matrix may also be large. In some examples, computing devices configured to implement post-quantum cryptographic techniques using such large matrices may not include sufficient storage to store such matrices for long periods of time and/or may not include sufficient computational resources to generate and/or re-generate the matrix as needed while maintaining the ability to perform other operations for which the computing device is intended.

Examples described herein address the need for reducing the amount of storage needed to implement a post-quantum encryption technique that uses matrices for signing and/or verifying data. In some examples, the storage reduction is based at least in part on the fact that the matrix used is a random matrix. As such, the elements of the matrix may be re-ordered without losing the ability to be used in a cryptographic scheme. Specifically, in some examples, the matrix may be represented as an array that includes the coefficients of the polynomials included in the elements of the matrix. In some examples, the array may be re-ordered to be in an ascending order. The difference between any two elements of the sorted array may be considered as the difference between the elements (e.g., deltas). In some examples, because the array is sorted in an ascending order, the corresponding difference between elements, in aggregate, is smaller than the elements themselves (from a data storage perspective). An array that includes the first element unchanged, and each subsequent element as the delta from the previous element may be considered as a delta-encoded array, in which an array of large numbers is encoded into a delta-encoded array of relatively smaller numbers.

The delta encoding of the array is reversible, as the cumulative sum of the delta-encoded array can recover the original array, and thus the original matrix.

In some examples, the delta-encoded array is subjected to any suitable form of entropy coding to achieve compression of the array. As an example, an asymmetric numeral system (ANS) (e.g., range ANS (rANS), tabled ANS (tANS), etc.) entropy encoding scheme may be used. Other entropy encoding schemes may be used without departing from the scope of examples described herein (e.g., finite state encoding, arithmetic encoding, etc.). In some examples, entropy encoding of data is a data compression method that uses statistical characteristics of the data to compress the data into a form that includes less data, where the original data is recoverable via a decoding process. In some examples, the result of entropy coding is an entropy-encoded output, which requires less storage space than the delta-encoded matrix. Such an entropy-encoded output allows a computing device to store a recoverable form of a matrix (e.g., an integer) using significantly less storage space than would be required to store the original matrix (e.g., when using a Dilithium matrix for cryptographic operations).

In some examples, after decoding the entropy-encoded output, a matrix may be obtained. The matrix may then be delta-decoded to obtain a form of the original matrix. However, the matrix obtained from such a procedure may not be the exact same as the original matrix, as the matrix is now a sorted matrix. Such a matrix does not appear random, as is often desired for matrices used for performing cryptographic operations. Therefore, in some examples, the resulting matrix after the entropy decoding and delta decoding may be shuffled. Such a shuffling may be performed, for example, using a pseudo-random number generator. In some examples, the shuffling is deterministic for a given matrix. As an example, to ensure the deterministic nature of the shuffling, a seed value may be selected for the pseudo-random number generator, and the seed value may be stored along with the compressed matrix. Thus, the shuffled matrix again appears to be a random matrix. Alternatively, the compressed matrix may be used as an input to a hash function, and the hash output may be used as the seed for shuffling the matrix. In some examples, any matrix subjected to the above-described delta-encoding, entropy-encoding, and shuffling, when decoded, results in the same matrix, which may be used to perform cryptographic operations (e.g., encryption, decryption, digital signing, digital signature verification, etc.)

Various aspects of the techniques described herein will be discussed below with respect to the figures. FIG. 1 is a block diagram illustrating an example of a computing device 100. As shown, the computing device 100 includes a processor 102, a universal flash storage (UFS) device 104, a memory device 108, an additional storage device 110, and a key management device 106. Each of these components is described below.

The computing device 100 is any device, portion of a device, or any set of devices capable of electronically processing instructions and may include, but is not limited to, any of the following: one or more processors (e.g. components that include integrated circuitry, memory, input and output device(s) (not shown), non-volatile storage hardware, one or more physical interfaces, any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality, virtual reality, etc.), any device that includes one or more SoCs, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

In some examples, the processor 102 is any component that includes circuitry for executing instructions (e.g., of a computer program). As an example, such circuitry may be integrated circuitry implemented, at least in part, using transistors implementing such components as arithmetic logic units, control units, logic gates, registers, first-in, first-out (FIFO) buffers, data and control buffers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 108) of the computing device 100. A processor may perform various operations for executing software, such as operating systems, applications, etc. The processor 102 may cause data to be written from memory to storage of the computing device 100 and/or cause data to be read from storage via the memory. Examples of processors include, but are not limited to, central processing units (CPUs), graphics processing units (GPUs), neural processing units, tensor processing units, display processing units, digital signal processors (DSPs), finite state machines, etc. The processor 102 may be operatively connected to the memory device 108, any storage (e.g., UFS device 104, additional storage device 110) of the computing device 100, and/or to the key management device 106. Although FIG. 1 shows the computing device 100 having a single processor 102, the computing device may include any number of processors without departing from the scope of examples described herein.

In some examples, the computing device 100 includes a UFS device 104. In some examples, the UFS device 104 is a flash storage device conforming to the UFS specification. The UFS device 104 may be used for storing data of any type. Data may be written to and/or read from the UFS device 104. As an example, the UFS device may store operating system images, software images, application data, etc. The UFS device 104 may store any other type of data without departing from the scope of examples described herein. In some examples, the UFS device 104 includes NAND flash storage. The UFS device 104 may use any other type of storage technology without departing from the scope of examples described herein. In some examples, the UFS device 104 is capable of data rates that are relatively faster than other storage devices (e.g., additional storage device 110) of the computing device 100. The UFS device 104 may be operatively connected to the processor 102, the memory device 108 and/or the additional storage device 110. Although FIG. 1 shows the computing device 100 having a single UFS device 104, the computing device may include any number of UFS devices without departing from the scope of examples described herein. Additionally, although FIG. 1 shows the UFS device 104, the computing device 100 may include any other type of flash storage device without departing from the scope of examples described herein.

In some examples, the computing device 100 includes an additional storage device 110. In some examples, the additional storage device is a non-volatile storage device. The additional storage device 110 may for example, be a persistent memory device. In some examples, the additional storage device 110 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 1 shows the additional storage device 110 as part of the computing device 100, the additional storage device may be separate from and operatively connected to the computing device 100 (e.g., an external drive array, cloud storage, etc.). In some examples, the additional storage device 110 operates at a data rate that is relatively slower than the UFS device 104. In some examples, the additional storage device 110 is also a UFS storage device. In some examples, the additional storage device 110 is operatively connected to the processor 102, the UFS device 104, the key management device, and/or the memory device 108. Although FIG. 1 shows the computing device 100 having a single additional storage device 110, the computing device 100 may have any number of additional storage devices without departing from the scope of examples described herein.

In some examples, the computing device 100 includes a memory device 108. The memory device may be any type of computer memory. In some examples, the memory device 108 is a volatile storage device. As an example, the memory device 108 may be random access memory (RAM). In one or more examples, data stored in the memory device 108 is located at memory addresses, and is thus accessible to the processor 102 and/or the key management device 106 using the memory addresses. Similarly, the processor 102 and/or key management device 106 (or components therein) may write data to and/or read data from the memory device 108 using the memory addresses. The memory device 108 may be used to store any type of data, such as, for example, computer programs, the results of computations, etc. In some examples, the memory device 108 is operatively connected to the processor 102, the UFS device 104, the additional storage device 110, and the key management device 106. Although FIG. 1 shows the computing device 100 having a single memory device 108, the computing device 100 may have any number of memory devices without departing from the scope of examples described herein.

In some examples, the computing device 100 includes a key management device 106. In some examples, the key management device 106 is any hardware, software, firmware, or combination thereof that is configured to perform various actions and operations to reduce the storage space necessary to store information to be used in a matrix-based scheme for performing cryptographic operations. As an example, the key management device 106 may be used to obtain a matrix (e.g., a Dilithium matrix), re-form the matrix into an array of coefficients of polynomial elements of the matrix, sort the array in an ascending order, and determine the difference between elements of the sorted array. In some examples, the sorted array may then be subjected to a delta encoding process, in which the matrix is transformed to include the first element, and each subsequent element is the difference from the previous element. Such an array of difference amounts may be referred to as a delta-encoded array, as all elements of the array, other than the first element, include the difference (e.g., delta) from the previous element in the array. In some examples, the delta-encoded array is then subjected to an entropy encoding. In some examples, an entropy encoding is any encoding scheme in which the entropy of the array is used to determine a new value that corresponds to the encoded array (e.g., an entropy encoded output). The entropy encoded output may be an integer value that is an output of an entropy encoding algorithm. Examples of such algorithms include, but are not limited to, ANS algorithms (e.g., rANS, tANS), finite state machine algorithms, arithmetic algorithms, etc. Other entropy encoding schemes may be used without departing from the scope of examples described herein. In some examples, the key management device 106 is operatively connected to the processor 102, the memory device 108, the UFS device 104, and/or the additional storage device 110. In some examples, the output of the entropy-encoding algorithm may be stored in one or more of such devices, and the storage space required may be less that the storage space required to store a full matrix that is to be used for performing cryptographic operations.

While FIG. 1 shows a certain number of components in a particular configuration, one of ordinary skill in the art will appreciate that the computing device 100 may include more components or fewer components, and/or components arranged in any number of alternate configurations without departing from the scope of examples described herein. Additionally, although not shown in FIG. 1, one of ordinary skill in the art will appreciate that the computing device 100 may execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 1.

Figure 2:
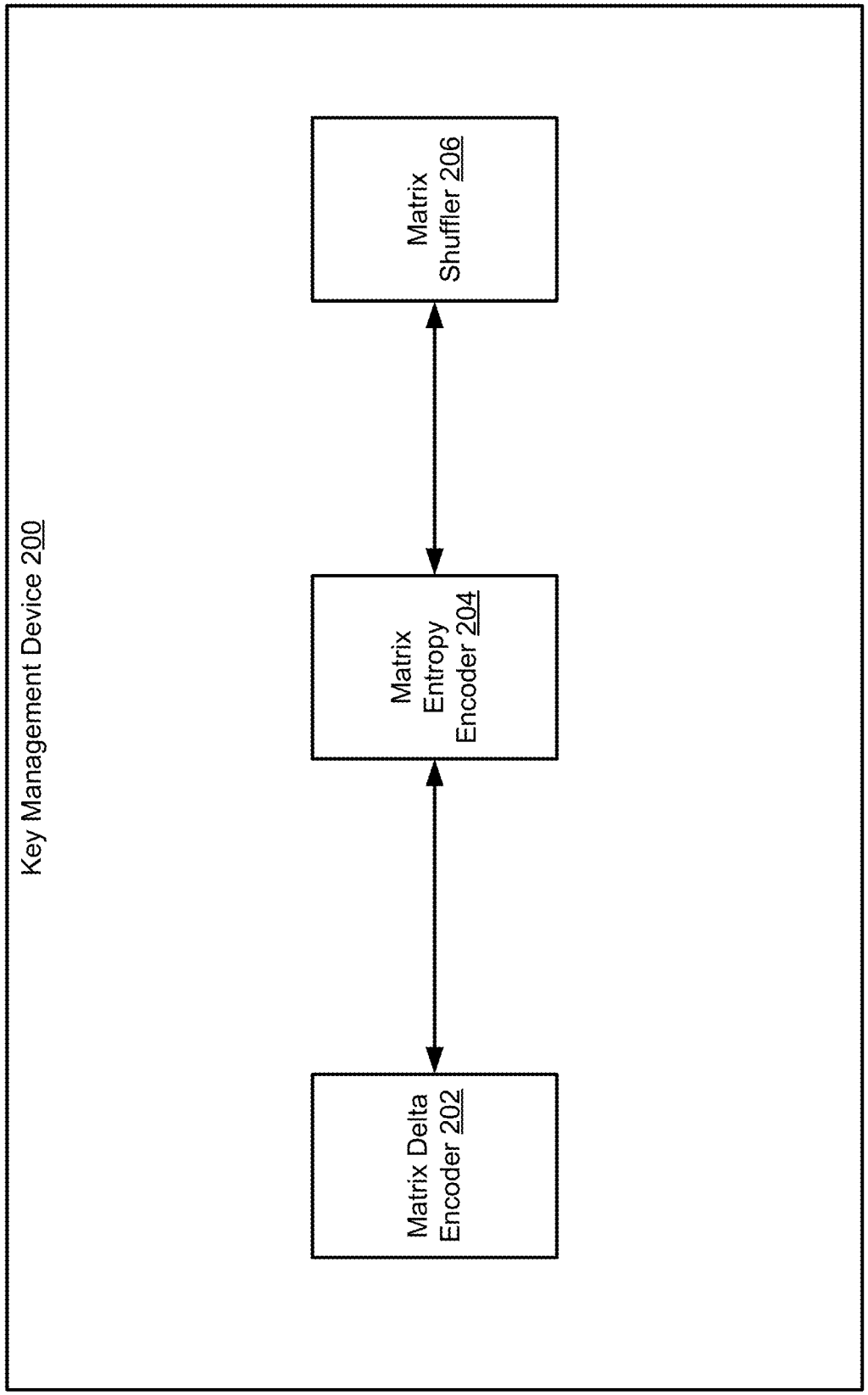
FIG. 2 is a block diagram illustrating an example of a key management device, in accordance with one or more examples described herein.

FIG. 2 is a block diagram illustrating an example of a key management device 200 in accordance with one or more examples described herein. In some examples, the key management device 200 includes a matrix delta encoder 202, a matrix entropy encoder 204, and a matrix shuffler 206. Each of these components is described below.

In some examples, the key management device 200 includes a matrix shuffler 206. The matrix shuffler 206 may be any hardware, software, firmware, or any combination thereof, that is configured to perform a shuffling of elements within a matrix. Shuffling of a matrix may be performed by any deterministic shuffling algorithm such as, for example, the Fisher-Yates algorithm. Any other deterministic shuffling algorithm may be used without departing from the scope of examples described herein. A shuffling algorithm may use a seed (e.g., a random number) to shuffle the matrix. In some examples, the seed for the algorithm is kept secret, but is known to the number of entities (e.g., two) that seek to work with the same (shuffled) matrix (e.g., during signing/signature verification). In some examples, shuffling the matrix conceals from third-party observers any structure that may reveal information related to how the matrix was obtained. The seed may be any seed capable of being used to obtain a random number. In some examples, the seed is a hash of the compressed matrix, obtained via providing the compressed matrix to a hashing algorithm.

In some examples, the key management device 200 includes a matrix delta encoder 202. The matrix delta encoder 202 may be any hardware, software, firmware, or any combination thereof, that is configured to obtain a matrix, and to delta-encode the matrix. A matrix delta encoder 202 may be all or any portion of the components of a computing device (e.g., the computing device 100 of FIG. 1). In some examples, the matrix delta encoder 202 is configured to encode a matrix based on differences between one element of an array created from a matrix of polynomials and the next element of the array. As an example, the coefficients of a matrix of polynomials may be used to generate an array. The first coefficient of such an array may be maintained, and each subsequent element of the array may be the difference between the element and the previous element in the array. Such an array may be referred to herein as a delta-encoded array. In some examples, the matrix delta encoder 202, is also configured to decode a delta encoded matrix. As an example, the matrix delta encoder 202 may be configured to perform a decoding of a matrix that has been delta encoded in order to obtain a matrix that was used in a previous encoding so that a computing device may obtain a cryptographic key and/or data that may be used in future operations.

In some examples, the key management device 200 includes a matrix entropy encoder 204. In some examples, the matrix entropy encoder 204 is any hardware, software, firmware, of any combination thereof, that is configured to entropy encode a matrix. As an example, a matrix may be subjected to a delta encoding process by the matrix delta encoder 202, and the resulting delta-encoded matrix may be used as input to the matrix entropy encoder 204. In some examples, the result is referred to as an entropy-encoded output. In some examples, an entropy encoded output is the result of subjecting the delta-encoded array to an entropy coding. In some examples, the output of the entropy ending technique is an integer that, via a reversible process, may be used to recover the original matrix. Any suitable entropy encoding technique may be used without departing from the scope of examples described herein (e.g., rANS encoding).

In some examples, to obtain a matrix to be used for lattice-based cryptographic techniques, the matrix may be represented as an array that includes as elements the coefficients of the elements of the matrix. The array may be sorted in ascending order, and delta encoded (e.g., by the delta encoder 202). The delta-encoded array may then be entropy encoded (e.g., by the matric entropy encoder 204) to produce an integer that represents the matrix. The integer output from the entropy encoding requires less storage space than storing the matrix itself, and the matrix may be recovered from the entropy encoded output through a process of entropy decoding and delta decoding. However, the result may not be an the same as the original matrix, as the elements of the matrix may now be ordered. In some examples, a seed is selected for the matrix, which may be stored along with the entropy encoded compressed form of the matrix. In some examples, the seed is used to generate a random number, which may be used with a deterministic shuffling algorithm. In some examples, the compressed matrix is entropy decoded, then delta encoded. The result is then input, along with the random number obtained using the seed, to generate a matrix. Such a matrix may be the same size as the original matrix, and the elements in the shuffled matrix may be the same as the elements of the original matrix, through shuffled in a deterministic manner. The resulting shuffled matrix may be used for implementing the post-quantum cryptographic technique (e.g., the Dilithium digital signature algorithm).

In one illustrative example, a user A may wish to send a document to user B. The two users agree to use the Dilithium digital signature algorithm. To that end, user A uses their secret key to obtain a digital signature of the document, and user B, after receiving the document, uses the public verification key to verify the validity of the document's signature and that the document was received from user A. Implicit in using the Dilithium algorithm for this exchange is that both users have agreed on a common matrix. In order to use such a common matrix, each user must have access to the same matrix. However, as discussed above, a matrix used in the Dilithium algorithm is a four by four matrix of degree-256 polynomials, with each polynomial coefficient being an integer less than $2^{32}$. Such a matrix may require a significant amount of storage space to store for the users, and/or may require a significant amount of computational resources to reproduce. To overcome these challenges, the users may use techniques described herein to compress the matrix into an integer via sorting, delta encoding, and entropy encoding. The integer may require less storage space than is required to store the original matrix. The integer may be stored with a seed. In order to use a common matrix, the users may each store the compressed matrix (e.g., the integer obtained after the entropy encoding) and the seed. The compressed matrix may be entropy decoded, and then delta decoded to obtain an array whose elements are the same as the elements of the original matrix, though in a different order (e.g., sorted). The array may then be used, along with the seed to shuffle the array using a suitable shuffling algorithm. The elements of the shuffled array may then be used as the coefficients of polynomials of a matrix. In some examples, when each of user A and user B perform the aforementioned procedure, the result is a common matrix that may be used when implementing the lattice-based technique for digital signatures (e.g., the Dilithium algorithm).

Figure 3:
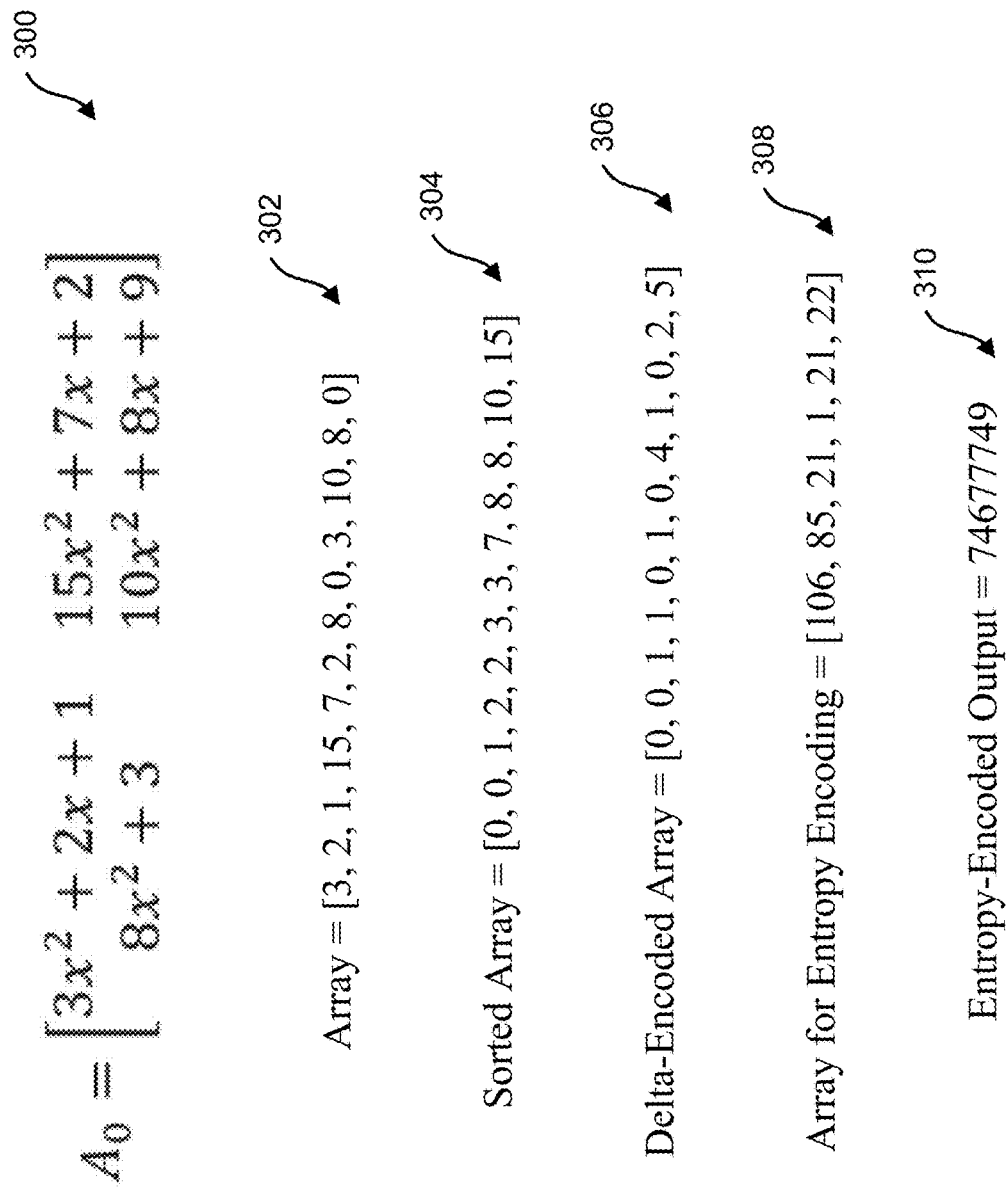
FIG. 3 illustrates an example of compressing a matrix to an entropy encoded output, in accordance with one or more examples described herein.

FIG. 3 illustrates an example of compressing a matrix to reduce the storage space required to use the matrix for performing cryptographic operations in accordance with one or more examples described herein. The following example is for explanatory purposes only and not intended to limit the scope of examples described herein. Additionally, while the example shows certain aspects of examples described herein, all possible aspects of such examples may not be illustrated in this particular example. The example set forth below uses a simple two by two matrix that includes degree-2 polynomials with coefficients that are less than sixteen. One having ordinary skill in the art, and the benefit of this detailed description, will appreciate that a matrix of any size, having polynomial elements of any degree and coefficients of any quantity, may be used without departing from the scope of examples described herein. For example, when using the Dilithium algorithm, a four by four matrix may be used, with polynomial elements having a degree of 256 and integer coefficients of any value less than $2^{32}$.

Consider a scenario where a matrix 300 is to be compressed. The matrix 300 is a two by two matrix. The first element is the polynomial $3x^2+2x+1$. The second element is the polynomial $15x^2+7x+2$. The third element is $8x^2+3$. The fourth element is $10x^2+8x+9$.

An array of the coefficients of the polynomial elements is shown is array 302 in FIG. 3. As such, the array 302 is an array that includes elements [3, 2., 1, 15, 7, 2, 8, 0, 3, 10, 8, 9]. The array 302 is then sorted to obtain the sorted array 304. The sorted array 304 is [0, 0, 1, 2, 2, 3, 3, 7, 8, 8, 10, 15].

The sorted array 304 is then delta encoded as a delta encoded array 306. The delta-encoded array 306 include the first element of the array 302, and the difference (e.g., deltas) of the subsequent elements of the array. Accordingly, the delta-encoded array 306 is [0, 0, 1, 1, 0, 1, 0, 4, 1, 0, 2, 5].

The delta-encoded array 306 is then subjected to entropy encoded using a rANS entropy encoding technique. The result of the entropy coding is an entropy encoded array [106, 85, 21, 1, 21, 22]. The entropy encoded array may be provided to an entropy encoding algorithm to yield an entropy encoded output. In this example, the entropy encoded output is the integer 746777749. The entropy encoded output may be stored, in binary form, as a twenty-seven bit digit. Storing the twenty-seven bit entropy-encoded output instead of the forty-eight bit representation of the matrix (e.g., 2×2 matrix multiplied by (2+1)) represents a savings in the storage space required to represent the matrix.

In some examples, the entropy encoded output is a compressed representation of the matrix, the storing of which requires less storage than storing the matrix. In some examples, in order to user the entropy-encoded output to perform a cryptographic operation, the entropy encoded output is subjected to a series of operations to recover an updated matrix. In some examples, the entropy-encoded output is first entropy-decoded to obtain an entropy decoded output, which may be, for an example, an array. The entropy-decoded output may then be provided for delta decoding, to yield a delta-decoded output. In some examples, the delta-decoded output is an array having elements that are the same as the delta-encoded array. However, such elements may appear in a sorted order. Such a sorted order may provide an observer some insight into the manner by which the delta-decoded array was generated. Accordingly, the delta-decoded array may then be used as input to a shuffling algorithm. An additional input to the shuffling algorithm may be a random number. The random number may be based, at least in part on a seed. The seed may be a number used to initialize a pseudo-random number generator. The seed may be a randomly selected number. Additionally or alternatively, the seed may be a hash of the compressed matrix (e.g., the entropy-encoded output). In either case, the shuffling algorithm produces a shuffled output, which may then be used to generate an updated matrix. In some examples, the updated matrix may then be used by various entities for performing cryptographic operations, such as, for example, generating and/or verifying digital signatures. In scenarios such as that described above, the original matrix, and the seed, are agreed upon by at least two entities seeking to use a lattice based algorithm for post-quantum cryptographic operations.

Figure 4:
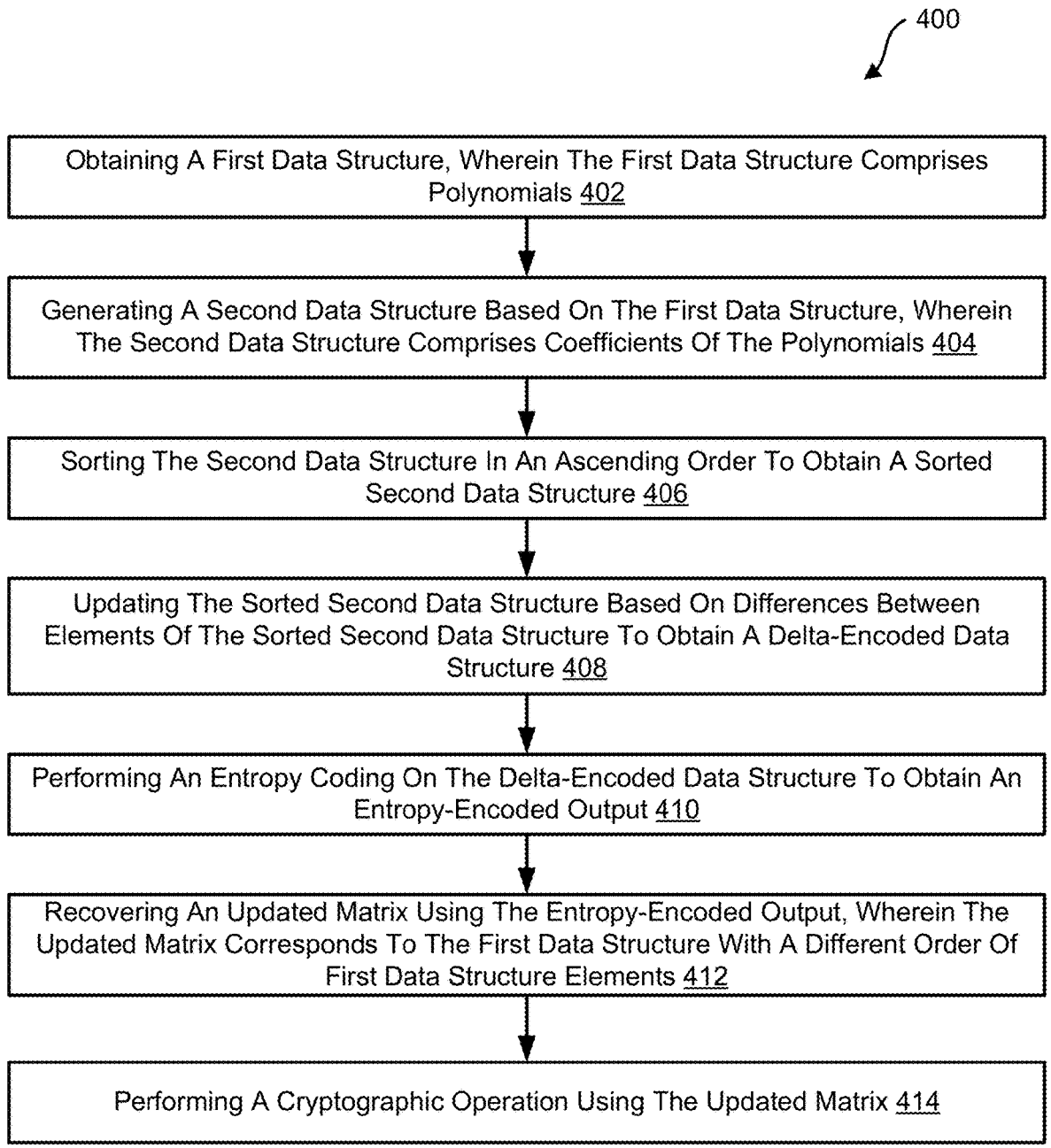
FIG. 4 is a flow diagram illustrating an example of a process for compressing data used in cryptographic operations, in accordance with one or more examples described herein.

FIG. 4 is a flow diagram illustrating an example of a process 400 for compressing data used in cryptographic operations in accordance with one or more examples described herein. The process 400 may be performed, at least in part, for example, by the computing device 100, or any component therein, such as the key management device 106.

At block 402, the process 400 includes obtaining a first data structure, wherein the first data structure comprises polynomials. In some examples, the first data structure is a matrix. As an example, the matric may be a matrix to be used in a Dilithium algorithm. As such, the matrix may for example, be a four by four matrix of 256 degree polynomials, with each coefficient being less than $2^{32}$. The first data structure may be obtained by the computing device 100, or any component therein (e.g., the key management device 106).

At block 404, the process 400 includes generating a second data structure based on the first data structure, wherein the second data structure comprises coefficients of the polynomials. In some examples, the second data structure is an array with elements corresponding to the coefficients of the matrix of the first data structure.

At block 406, the process 400 includes sorting the second data structure in an ascending order to obtain a sorted second data structure. In some examples, the sorted second data structure is an array sorted in ascending order based on the value of the elements therein, which may be the coefficients of the polynomials included in the first data structure obtained at block 404.

At block 408, the process 400 includes updating the sorted second data structure based on differences between elements of the sorted second data structure to obtain a delta-encoded data structure. The delta encoded data structure may for example, be obtained by the delta encoder 202 of FIG. 2. In some examples, the delta encoded data structure may include the same first element as the sorted second data structure, with each subsequent element representing a difference (e.g. delta) between the element and the previous element of the array.

At block 410, the process 400 includes performing an entropy coding on the delta-encoded data structure to obtain an entropy-encoded output. In some examples, the entropy encoding may be performed by the matrix entropy encoder 204 of FIG. 2. In some examples, the entropy encoding is performed using any suitable entropy encoding algorithm. As an example, the entropy encoding may be performed using the rANS algorithm. In some examples, the entropy-encoded output is an integer representation of the delta-encoded first data structure. As such, storing the entropy-encoded output may require less storage space than storing the original matrix.

At block 412, the process 400 includes recovering an updated first data structure using the entropy-encoded output, wherein the updated first data structure corresponds to the first data structure with a different order of first data structure elements. In some examples, the first data structure is a matrix, and the updated first data structure is a matrix with elements therein in a different order. In some examples, recovering the updated first data structure includes performing an entropy decoding of the entropy-encoded output to obtain an entropy-decoded output, and performing a delta decoding of the entropy-decoded output to obtain a delta-decoded output. In some examples, the process 400 includes shuffling the delta-decoded output using a shuffling algorithm to obtain a shuffled output, wherein the delta-decoded output and an output of a pseudo-ransom number generator are used as input to the shuffling algorithm to obtain the shuffled output and using the shuffled output to obtain the updated first data structure. In some examples, the process 400 includes shuffling the delta-decoded output using a shuffling algorithm to obtain a shuffled output, wherein the delta-decoded output and a hash of the entropy-encoded output are used as input to the shuffling algorithm to obtain the shuffled output, and using the shuffled output to obtain the updated first data structure. In some examples, the updated first data structure is used by relevant entities (e.g. a sender and receiver of a document) to, at least in part, protect the contents of communications between the entities.

In some examples, the process 400, or any other process described herein may be performed by a computing device or apparatus, and/or one or more components therein and/or to which the computing device is operatively connected. As an example, the process 400 may be performed wholly or in part by the key management device 106 shown in FIG. 1 and described above, and/or the computing system 500 shown in FIG. 5 and described below (or any one or more components therein).

A computing device, may be, include, or be a component of any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, a smart speaker, a voice assistant device, a SoC, and/or any other device with the resource capabilities to perform the processes described herein, including the process 300, and/or other process described herein. In some cases, a computing device or apparatus (e.g., that includes a hardware identity impersonator) may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, an RF sensing component, any combination thereof, and/or other component(s). The network interface may be configured to communicate and/or receive Internet Protocol (IP) based data or other type of data.

The components of a computing device (e.g., the computing device 100 of FIG. 1) may be implemented, at least in part, in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), finite state machines, and/or other suitable electronic circuits), and/or can include and/or be implemented, at least in part, using computer software, firmware, or any combination thereof, to perform the various operations described herein.

The process 400 shown in FIG. 4 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 5:
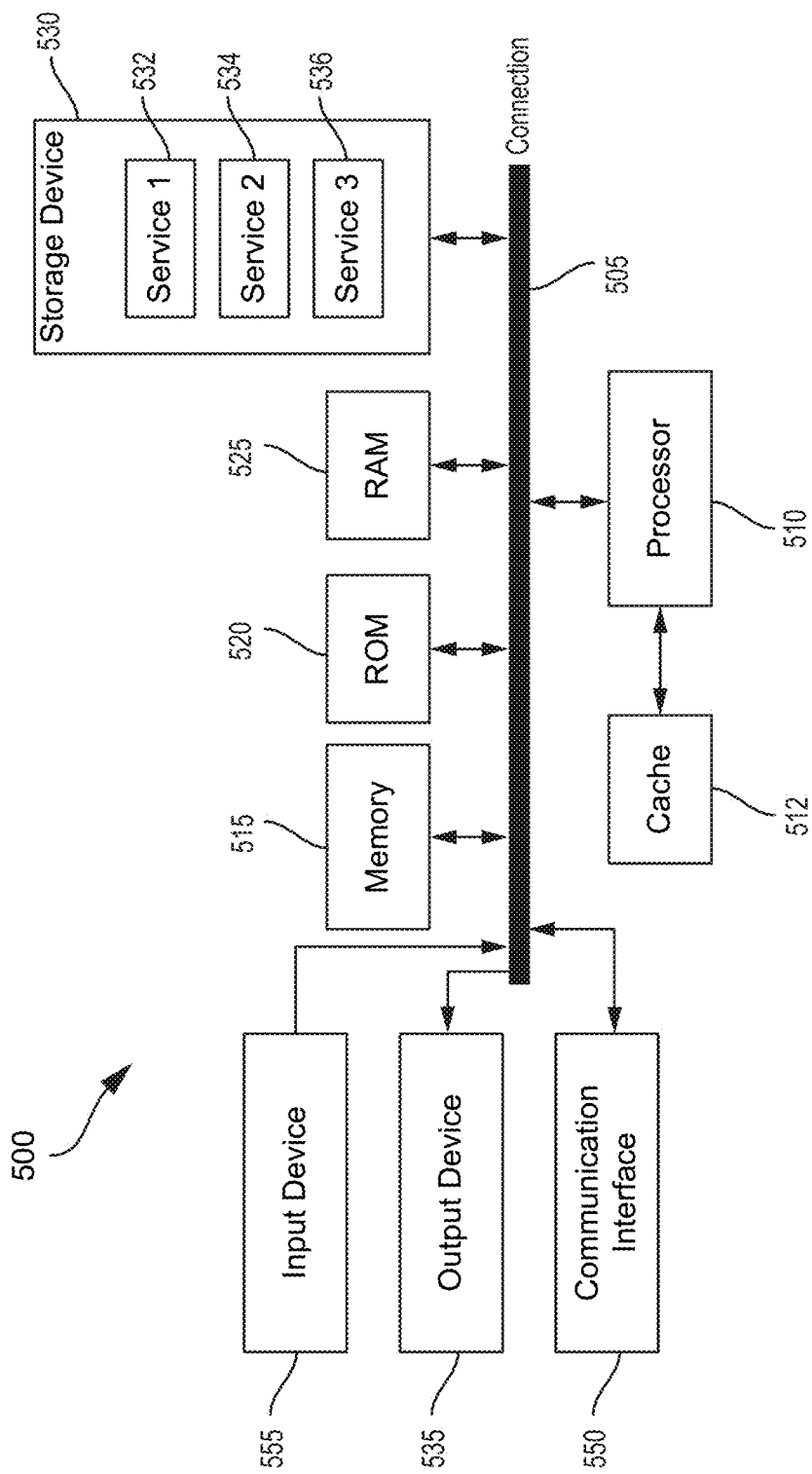
FIG. 5 is a diagram illustrating an example of a computing system for implementing certain aspects described herein.

FIG. 5 is a diagram illustrating an example of a system for implementing certain aspects of the present technology. In particular, FIG. 5 illustrates an example of computing system 500, which can be for example any computing device making up internal computing system, a remote computing system, a camera, or any component thereof in which the components of the system are in communication with each other using connection 505. Connection 505 can be a physical connection using a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache 512 of high-speed memory connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms or sensors, such as a microphone for speech (e.g., a user speaking), a touch-sensitive screen for gesture or graphical input (e.g., a user performing sign language symbols, a user shaking a phone, etc.), keyboard (e.g., a user pressing a key), mouse, motion input, a determination that a user is in a location indicated by a positioning system or modem sub-system, etc., which may be used to activate counters described in previous sections and enable/disable the asset transmission chain at any stage previously described. Computing system 500 can also include output device 535, which can be one or more of a number of output mechanisms. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 440 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a blu-ray® disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof. The storage device 530 can include software instructions or code that can be executed by the processor 510 to cause the system 500 to perform a function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for compressing data used in cryptographic operations, the method comprising: obtaining a first data structure, wherein the first data structure comprises polynomials; generating a second data structure based on the first data structure, wherein the second data structure comprises coefficients of the polynomials; sorting the second data structure in an ascending order to obtain a sorted second data structure; updating the sorted second data structure based on differences between elements of the sorted second data structure to obtain a delta-encoded data structure; performing an entropy coding on the delta-encoded data structure to obtain an entropy-encoded output; recovering an updated first data structure using the entropy-encoded output, wherein the updated first data structure corresponds to the first data structure with a different order of first data structure elements; and performing a cryptographic operation using the updated first data structure.

Aspect 2: The method of aspect 1, wherein recovering the updated first data structure comprises: performing an entropy decoding of the entropy-encoded output to obtain an entropy-decoded output; and performing a delta decoding of the entropy-decoded output to obtain a delta-decoded output.

Aspect 3: The method of aspect 1 or 2, wherein recovering the updated first data structure further comprises: shuffling the delta-decoded output using a shuffling algorithm to obtain a shuffled output, wherein the delta-decoded output and an output of a pseudo-ransom number generator are used as input to the shuffling algorithm to obtain the shuffled output; and using the shuffled output to obtain the updated first data structure.

Aspect 4: The method of any of aspects 1 to 3, wherein recovering the updated first data structure further comprises: shuffling the delta-decoded output using a shuffling algorithm to obtain a shuffled output, wherein the delta-decoded output and a hash of the entropy-encoded output are used as input to the shuffling algorithm to obtain the shuffled output; and using the shuffled output to obtain the updated first data structure.

Aspect 5: The method of any of aspects 1 to 4: wherein the entropy coding is performed using an asymmetric numeral system.

Aspect 6: The method of any of aspects 1 to 5: wherein the cryptographic operation includes encryption or decryption of data.

Aspect 7: The method of any of aspects 1 to 6: further comprising storing the entropy-encoded output.

Aspect 8: The method of any of aspects 1 to 7: wherein the first data structure is a matrix, and the polynomials are elements of the matrix.

Aspect 9: The method of any of aspects 1 to 8: wherein the matrix is a Dilithium matrix.

Aspect 10: The method of any of aspects 1 to 9: matrix is a four by four matrix of polynomial functions.

Aspect 11: The method of any of aspects 1 to 10: wherein the second data structure is an array.

Aspect 12: The method of any of aspects 1 to 11: wherein the entropy-encoded output is an integer with a size less than the first data structure.

Aspect 13: An apparatus for compressing data used in cryptographic operations, the apparatus comprising: at least one memory; and at least one processor coupled to the at least one memory and configured to: obtain a first data structure, wherein the first data structure comprises polynomials; generate a second data structure based on the first data structure, wherein the second data structure comprises coefficients of the polynomials; sort the second data structure in an ascending order to obtain a sorted second data structure; update the sorted second data structure based on differences between elements of the sorted second data structure to obtain a delta-encoded data structure; perform an entropy coding on the delta-encoded data structure to obtain an entropy-encoded output; recover an updated first data structure using the entropy-encoded output, wherein the updated first data structure corresponds to the first data structure with a different order of first data structure elements; and perform a cryptographic operation using the updated first data structure.

Aspect 14: The apparatus of aspect 13, wherein, to recover the updated matrix, the at least one processor is further configured to: perform an entropy decoding of the entropy-encoded output to obtain an entropy-decoded output; and perform a delta decoding of the entropy-decoded output to obtain a delta-decoded output.

Aspect 15: The apparatus of aspects 13 or 14, wherein, to recover the updated matrix, the at least one processor is further configured to: shuffle the delta-decoded output using a shuffling algorithm to obtain a shuffled output, wherein the delta-decoded output and an output of a pseudo-ransom number generator are used as input to the shuffling algorithm to obtain the shuffled output; and use the shuffled output to obtain the updated matrix.

Aspect 16: The apparatus of any of aspects 13 to 15, wherein, to recover the updated matrix, the at least one processor is further configured to: shuffle the delta-decoded output using a shuffling algorithm to obtain a shuffled output, wherein the delta-decoded output and a hash of the entropy-encoded output are used as input to the shuffling algorithm to obtain the shuffled output; and use the shuffled output to obtain the updated matrix.

Aspect 17: The apparatus of any of aspects 13 to 16, wherein the entropy coding is performed using an asymmetric numeral system.

Aspect 18: The apparatus of any of aspects 13 to 17, wherein the cryptographic operation includes encryption or decryption of data.

Aspect 19: The apparatus of any of aspects 13 to 18, further comprising storing the entropy-encoded output.

Aspect 20: The apparatus of any of aspects 13 to 19, wherein the first data structure is a matrix, and the polynomials are elements of the matrix.

Aspect 21: The apparatus of any of aspects 13 to 20, wherein the matrix is a Dilithium matrix.

Aspect 22: The apparatus of any of aspects 13 to 31, wherein the matrix is a four by four matrix of polynomial functions.

Aspect 23: The apparatus of any of aspects 13 to 22, wherein the second data structure is an array.

Aspect 24: The apparatus of any of aspects 13 to 23, wherein the entropy-encoded output is an integer with a size less than the first data structure.

Aspect 25: A non-transitory computer-readable medium having stored thereon instructions that, when executed by one or more processors, cause the one or more processors to: obtain a first data structure, wherein the first data structure comprises polynomials; generate a second data structure based on the first data structure, wherein the second data structure comprises coefficients of the polynomials; sorting the second data structure in an ascending order to obtain a sorted second data structure; update the sorted second data structure based on differences between elements of the sorted second data structure to obtain a delta-encoded data structure; perform an entropy coding on the delta-encoded data structure to obtain an entropy-encoded output; recover an updated first data structure using the entropy-encoded output, wherein the updated first data structure corresponds to the first data structure with a different order of first data structure elements; and perform a cryptographic operation using the updated first data structure.

Aspect 26: The non-transitory computer readable medium of aspect 25, wherein, to recover the updated matrix, the instructions further cause the one or processors to: perform an entropy decoding of the entropy-encoded output to obtain an entropy-decoded output; and perform a delta decoding of the entropy-decoded output to obtain a delta-decoded output.

Aspect 27: The non-transitory computer readable medium of aspect 25 or 26, wherein the instructions further cause the one or processors to: shuffle the delta-decoded output using a shuffling algorithm to obtain a shuffled output, wherein the delta-decoded output and an output of a pseudo-ransom number generator are used as input to the shuffling algorithm to obtain the shuffled output; and use the shuffled output to obtain the updated matrix.

Aspect 28: The non-transitory computer readable medium of any of aspects 25 to 27, wherein the instructions further cause the one or processors to: shuffle the delta-decoded output using a shuffling algorithm to obtain a shuffled output, wherein the delta-decoded output and a hash of the entropy-encoded output are used as input to the shuffling algorithm to obtain the shuffled output; and use the shuffled output to obtain the updated matrix.

Aspect 29: The non-transitory computer readable medium of any of aspects 25 to 28, wherein the first data structure is a matrix and the second data structure is an array.

Aspect 30: The non-transitory computer readable medium of any of aspects 25 to 30, wherein the entropy-encoded output is an integer with a size less than the first data structure.

Aspect 31. An apparatus for compressing data used in cryptographic operations, comprising one or more means for performing operations according to any of Aspects 1 to 12.

What is claimed is:

1. A method for compressing data used in cryptographic operations, the method comprising:
    obtaining a first data structure for performing a cryptographic operation, wherein the first data structure comprises polynomials;
    generating a second data structure based on the first data structure, wherein the second data structure comprises coefficients of the polynomials;
    sorting the second data structure in an order to obtain a sorted second data structure;
    updating the sorted second data structure based on differences between elements of the sorted second data structure to obtain a delta-encoded data structure;
    performing an entropy coding on the delta-encoded data structure to obtain an entropy-encoded output;
    performing an entropy decoding of the entropy-encoded output to obtain an entropy-decoded output;
    performing a delta decoding of the entropy-decoded output to obtain a delta-decoded output to recover an updated first data structure, wherein the updated first data structure corresponds to the first data structure with a different order of first data structure elements;
    performing the cryptographic operation using the updated first data structure; and
    outputting a result of the cryptographic operation.

2. The method of claim 1, wherein recovering the updated first data structure further comprises:
    shuffling the delta-decoded output using a shuffling algorithm to obtain a shuffled output, wherein the delta-decoded output and an output of a pseudo-ransom number generator are used as input to the shuffling algorithm to obtain the shuffled output; and using the shuffled output to obtain the updated first data structure.

3. The method of claim 1, wherein recovering the updated first data structure further comprises:
shuffling the delta-decoded output using a shuffling algorithm to obtain a shuffled output, wherein the delta-decoded output and a hash of the entropy-encoded output are used as input to the shuffling algorithm to obtain the shuffled output; and
using the shuffled output to obtain the updated first data structure.

4. The method of claim 1, wherein the entropy coding is performed using an asymmetric numeral system.

5. The method of claim 1, wherein the cryptographic operation includes encryption or decryption of data.

6. The method of claim 1, further comprising storing the entropy-encoded output.

7. The method of claim 1, wherein the first data structure is a matrix, and the polynomials are elements of the matrix.

8. The method of claim 7, wherein the matrix is a Dilithium matrix.

9. The method of claim 7, wherein the matrix is a four by four matrix of polynomial functions.

10. The method of claim 1, wherein the second data structure is an array.

11. The method of claim 1, wherein the entropy-encoded output is an integer with a size less than the first data structure.

12. An apparatus for compressing data used in cryptographic operations, the apparatus comprising:
at least one memory; and
at least one processor coupled to the at least one memory and configured to:
obtain a first data structure for performing a cryptographic operation, wherein the first data structure comprises polynomials;
generate a second data structure based on the first data structure, wherein the second data structure comprises coefficients of the polynomials;
sort the second data structure in an order to obtain a sorted second data structure;
update the sorted second data structure based on differences between elements of the sorted second data structure to obtain a delta-encoded data structure;
perform an entropy coding on the delta-encoded data structure to obtain an entropy-encoded output;
perform an entropy decoding of the entropy-encoded output to obtain an entropy-decoded output;
perform a delta decoding of the entropy-decoded output to obtain a delta-decoded output to recover an updated first data structure, wherein the updated first data structure corresponds to the first data structure with a different order of first data structure elements;
perform the cryptographic operation using the updated first data structure; and
output a result of the cryptographic operation.

13. The apparatus of claim 12, wherein, to recover the updated first data structure, the at least one processor is further configured to:
shuffle the delta-decoded output using a shuffling algorithm to obtain a shuffled output, wherein the delta-decoded output and an output of a pseudo-ransom number generator are used as input to the shuffling algorithm to obtain the shuffled output; and
use the shuffled output to obtain the updated first data structure.

14. The apparatus of claim 12, wherein, to recover the updated first data structure, the at least one processor is further configured to:
shuffle the delta-decoded output using a shuffling algorithm to obtain a shuffled output, wherein the delta-decoded output and a hash of the entropy-encoded output are used as input to the shuffling algorithm to obtain the shuffled output; and
use the shuffled output to obtain the updated first data structure.

15. The apparatus of claim 12, wherein the entropy coding is performed using an asymmetric numeral system.

16. The apparatus of claim 12, wherein the cryptographic operation includes encryption or decryption of data.

17. The apparatus of claim 12, further comprising storing the entropy-encoded output.

18. The apparatus of claim 12, wherein the first data structure is a matrix, and the polynomials are elements of the matrix.

19. The apparatus of claim 18, wherein the matrix is a Dilithium matrix.

20. The apparatus of claim 18, wherein the matrix is a four by four matrix of polynomial functions.

21. The apparatus of claim 12, wherein the second data structure is an array.

22. The apparatus of claim 12, wherein the entropy-encoded output is an integer with a size less than the first data structure.

23. A non-transitory computer-readable medium having stored thereon instructions that, when executed by one or more processors, cause the one or more processors to:
obtain a first data structure for performing a cryptographic operation, wherein the first data structure comprises polynomials;
generate a second data structure based on the first data structure, wherein the second data structure comprises coefficients of the polynomials;
sorting the second data structure in an order to obtain a sorted second data structure;
update the sorted second data structure based on differences between elements of the sorted second data structure to obtain a delta-encoded data structure;
perform an entropy coding on the delta-encoded data structure to obtain an entropy-encoded output;
perform an entropy decoding of the entropy-encoded output to obtain an entropy-decoded output;
perform a delta decoding of the entropy-decoded output to obtain a delta-decoded output to recover an updated first data structure, wherein the updated first data structure corresponds to the first data structure with a different order of first data structure elements;
perform the cryptographic operation using the updated first data structure; and
output a result of the cryptographic operation.

24. The non-transitory computer-readable medium of claim 23, wherein the instructions further cause the one or more processors to:
shuffle the delta-decoded output using a shuffling algorithm to obtain a shuffled output, wherein the delta-decoded output and an output of a pseudo-ransom number generator are used as input to the shuffling algorithm to obtain the shuffled output; and
use the shuffled output to obtain the updated first data structure.

25. The non-transitory computer-readable medium of claim 23, wherein the instructions further cause the one or more processors to:

shuffle the delta-decoded output using a shuffling algorithm to obtain a shuffled output, wherein the delta-decoded output and a hash of the entropy-encoded output are used as input to the shuffling algorithm to obtain the shuffled output; and use the shuffled output to obtain the updated first data structure.

26. The non-transitory computer-readable medium of claim 23, wherein the first data structure is a matrix and the second data structure is an array.

27. The non-transitory computer-readable medium of claim 23, wherein the entropy-encoded output is an integer with a size less than the first data structure.

28. The non-transitory computer-readable medium of claim 23, wherein the entropy coding is performed using an asymmetric numeral system.

29. The non-transitory computer-readable medium of claim 23, wherein the cryptographic operation includes encryption or decryption of data.

30. The non-transitory computer-readable medium of claim 23, wherein the instructions further cause the one or more processors to store the entropy-encoded output.

* * * * *